INVENTOR.
STANLEY I. MacDUFF
BY Cecil J Arens
ATTORNEY

June 12, 1956　　　S. I. MacDUFF　　　2,749,885
CONTROL DEVICE FOR WINDSHIELD WIPER MECHANISM
Filed Dec. 14, 1948　　　　　　　　　　　　3 Sheets-Sheet 2

INVENTOR.
STANLEY I. MacDUFF
BY Cecil J. Arens
ATTORNEY

June 12, 1956 S. I. MacDUFF 2,749,885
CONTROL DEVICE FOR WINDSHIELD WIPER MECHANISM
Filed Dec. 14, 1948 3 Sheets-Sheet 3

INVENTOR.
STANLEY I. MACDUFF
BY Cecil J. Arens
ATTORNEY

United States Patent Office 2,749,885
Patented June 12, 1956

2,749,885
CONTROL DEVICE FOR WINDSHIELD WIPER MECHANISM

Stanley I. MacDuff, South Bend, Ind., assignor to Bendix Aviation Corporation, South Bend, Ind., a corporation of Delaware Application December 14, 1948, Serial No. 65,228

6 Claims. (Cl. 121—164)

This invention relates to control devices and more particularly to hydraulically controlled mechanisms for use on vehicles.

It is an object of the invention to provide a novel fluid metering control for use in a hydraulic system.

An important object of this invention resides in the provision of a hydraulic system wherein a fluid pressure actuated device is controlled in its movement by a novel control mechanism.

A further object of the invention is to provide a hydraulic system wherein a fluid pressure actuated device may be hydraulically locked into a preselected position.

A still further object of the invention resides in the provision of a hydraulic system embracing a fluid motor mechanism and a control therefor, whereby said mechanism may be regulated as to speed and also parked in a predetermined position.

The above and other objects and features of the invention will be apparent from the following description of the apparatus taken in conection with the accompanying drawings which form a part of this specification and in which.

Figure 1:
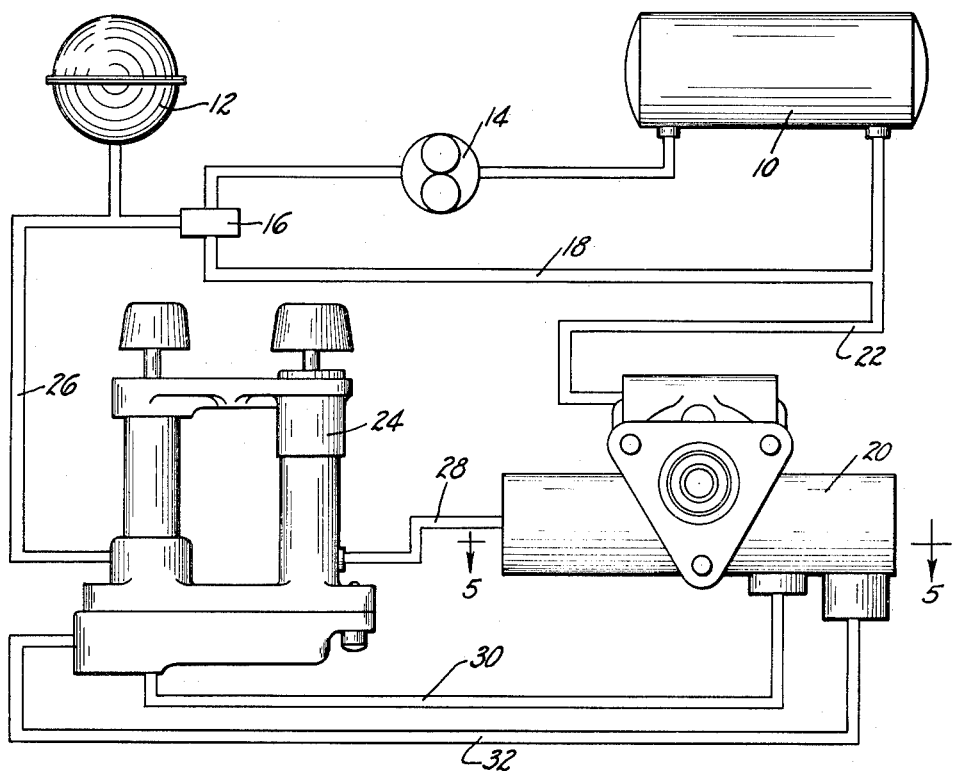
Figure 1 represents a hydraulic system embracing the novel features of the invention.

Referring now to Figure 1 of the drawings the reference numeral 10 designates a fluid reservoir to which an accumulator 12 is connected to receive fluid under pressure. A pump 14 is interposed in the connection between the reservoir 10 and the accumulator to pressurize the fluid for use in the system. A regulator or unloading valve 16 is connected between the pump and accumulator and is provided with a return line 18 connected to the reservoir for by-passing fluid thereto when the fluid under pressure in the accumulator reaches a predetermined value. A hydraulically actuated motor mechanism 20 intended primarily as a windshield wiper mechanism but not limited thereto is connected to the reservoir 10 through a conduit 22 which taps the return line 18. The motor mechanism receives its supply of fluid under pressure from the accumulator 12 via a control device 24. A pipe line 26 connects the control device to the accumulator. Pipe lines 28, 30, and 32 communicate the motor mechanism with the control device.

The unloading or regulator valve 16 communicates the accumulator with the pump when the fluid under pressure in the accumulator is below a predetermined value. However, when the fluid under pressure in the accumulator is above a predetermined value the unloading valve is caused to cut off communication between the pump and accumulator and establish communication between the pump outlet and the reservoir through the return line 18. The details of the construction and operation of the unloading valve are familiar to those skilled in the art and need not be given in this specification, since the unloading valve per se forms no part of the present invention.

Figure 5:
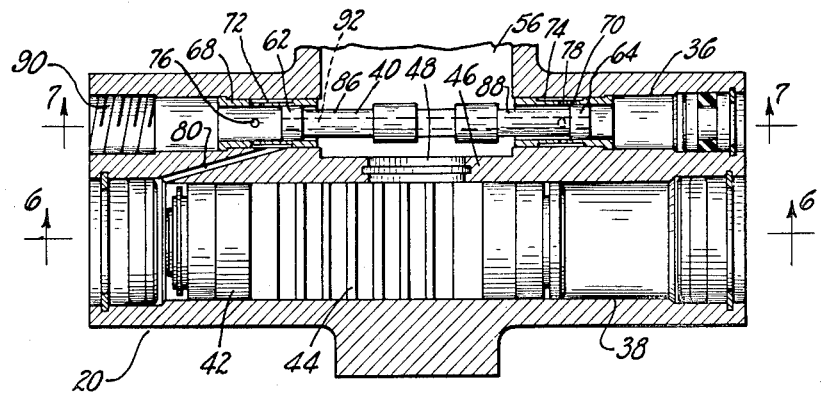
Figure 5 is a view in section taken on the line 5—5 through the fluid operated mechanism of Figure 1 showing the valve means therefore.
Figure 6:
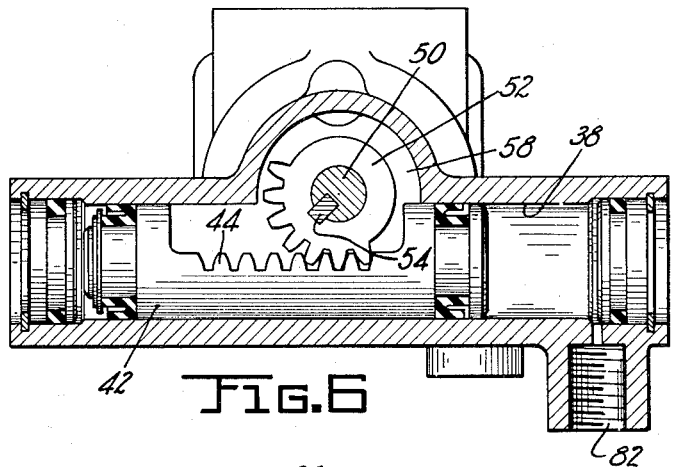
Figure 6 is a view in section taken on the line 6—6 of Figure 5 showing the driving connection between the gear sector and rack.

The fluid motor mechanism 20 comprises a housing 34 provided with parallel bores 36 and 38. The bore 36 receives a slidable spool valve 40, and the bore 38 is formed to accommodate a piston 42 with which a gear rack 44 is integral. The bores 36 and 38 are separated by a wall or partition 46 having a transverse opening 48 therein to rotatably carry a shaft 50 disposed at right angles to said piston. The shaft 50 is equipped with a gear sector 52 arranged in meshing relationship to said rack. A key 54 fixedly secures the gear sector to the shaft. The bores 36 and 38 are expanded intermediate their ends to form chambers 56 and 58 to thereby house respectively a valve actuating mechanism 60 and the gear sector 52. The spool valve 40 is provided with lands 62 and 64 at its ends for controlling communication between the ends of the bore 38 and the inlet and outlet ports. An outlet or exhaust port 66 communicates with the chamber 56. The lands 62 and 64 are machined and then lapped to slidably fit in sleeves 68 and 70 respectively which are pressed into the bore 36. These sleeves are formed with external grooves 72 and 74 having radial passages 76 and 78 respectively for communicating the interior of the sleeves with said external grooves of the respective sleeves. A passage 80 connects the external groove 72 of sleeve 68 with one end of the bore 38. Except for this passage this end of the bore is closed. The other end of the bore 38 is provided with an opening 82 which is connected to the control device 24 through the pipe line 32. The external groove 74, of the sleeve 70, communicates with the control device 24 through the conduit 30, which threadedly engages opening 84 which terminates in said external groove of said sleeve 70. The spool valve 40 is reduced in diameter or necked in at 86 and 88 to permit the free passage of fluid to chamber 56 via the space between the interior of the sleeves and the reduced diameter of the spool valve. With the spool valve in the position shown in Figure 5 fluid can flow freely from the external groove 74 of the sleeve 70, through the radial passages 78, into the space between the reduced diameter 88 of the spool valve and the interior of the sleeve, and thence to chamber 56. With the spool valve shifted to the left, so that the land 62 is to the left of the radial passages 76, fluid will pass freely from the left end of bore 38 through passage 80, external groove 72, radial passages 76, into the space between the reduced diameter 86 of the spool valve and the sleeve, and thence to the chamber 56. An opening 90 in the left end of the bore 36 is threaded to receive the pipe line 28 to thereby connect the interior of the bore 36 with the control device. The spool valve is bored longitudinally to provide a passage 92 to thereby communicate the right end of the bore 36 with the left end.

Figure 7:
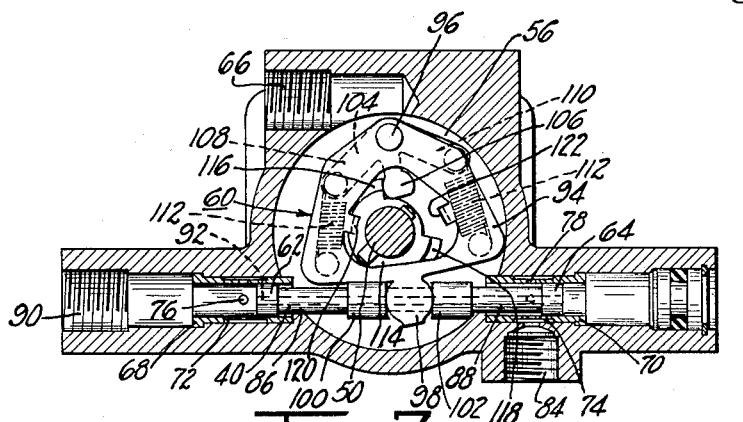
Figure 7 is a view in section of the invention taken substantially on the line 7—7 of Figure 5.

To shift the spool valve 40 at the proper time, to thereby reverse the application of fluid under pressure to the piston, the valve actuating mechanism 60 is provided. This mechanism comprises an actuating lever 94 pivotally carried in the chamber 56 by a pin 96. The free end of the actuating lever is formed with a rounded portion 98 for engagement with enlarged sections 100 and 102 of the spool valve. A yoke 104 is also pivotally carried by the pin 96. The yoke is arranged to be rotated relative to the actuating lever 94. The yoke is formed with a center finger 106 and two oppositely extending arms 108 and 110. Each of two coiled springs 112 is carried at one end by the arms 108 and 110, respectively, and the other ends of the springs are fastened to the actuating lever 94. An interlock coupling 114 is securely keyed to the shaft 50 for driving the actuating lever 94 through the springs 112 and finger 106 of the yoke 104. This arrangement between the yoke and actuating lever provides a yieldable driving connection. The interlock coupling also serves to retard the actuating action of the lever 94. To this end interlock coupling is formed with circumferential axially extending flanges 116 and 118 which cooperate with lugs 120 and 122 carried by the actuating lever, to thereby defer rotation of the actuating lever, and hence movement of the valve spool, until the piston has traveled to the end of its stroke. In the position shown in Figure 7, the actuating lever 94 has been rotated counterclockwise by the flange 116 of the interlock coupling which is in driving engagement with the finger 106. It will be noted that the flange 116 has rotated beyond the lug 120 to permit the actuating lever to swing to the right or counterclockwise under the influence of the spring 112 which is located on the right side of the actuating mechanism. The spool valve is now positioned to admit fluid to the left end of the bore 38 to thereby tend to urge the piston 42 to the right and rotate the shaft 50 counterclockwise. With piston movement to the right flange 118 will now be moved into engagement with the finger 106 to thereby tend to swing the yoke and actuating lever to the left or clockwise. However, only the yoke can be swung to the left at this time, that is, during the initial engagement between the flange 118 and finger 106 the actuating lever cannot be swung to the left since the lug 122 of the lever is riding against the outer side of the flange 118. Continued rotation of the yoke, under the driving action of the interlock coupling, will stretch the spring 112 which is located on the left. This spring will continue to stretch, that is, be put under tension until the interlock coupling has rotated counterclockwise to a position where the lug 122 no longer rides on the flange 118, at which time the actuating lever 94 will be shifted to the left under the influence of the spring 112 located on the left side of the actuating lever. This movement of the actuating lever slides the spool valve to the left so that fluid under pressure will now be admitted to the right end of the bore 38. At this time the piston is to the right end of the bore 38 but will be returned to the left end of the bore under the influence of the fluid under pressure acting in said right end of the bore, to thereby complete the cycle. The flange 116 and lug 120 cooperate during movement of the piston to the left, to thereby defer shifting of the spool valve to the right, in the same manner that the flange 118 and lug 112 cooperate to defer shifting of the spool valve to the left when the piston is being moved to the right.

The control device 24 comprises a flow regulating valve 126 and a selector valve 127 disposed in a housing 129, the latter of which selectively positions the piston 42 in the bore 38. The regulating valve 126 includes a valve member 128 freely slidable in a sleeve 130 disposed within a bore 132, one end of which communicates with an inlet passage 134. The other end of the bore is provided with a plug 136 for threadedly receiving a manually adjustable screw member 138 having a rounded end portion 140. The sleeve 128 is formed with an annulus 142 which registers with an exterior opening 144 which terminates in the bore 132. The opening 144 receives one end of the pipe line 28, the other end of which is connected to the opening 90 of the motor mechanism. Radial passages 146 of the sleeve 130 communicate the interior of the sleeve with the annulus 142. The valve member 128 is sleeve-like in construction with one end closed except for a metering passage 148 having a predetermined area which is ascertained by the maximum flow requirement of the fluid motor mechanism 20. The valve member 128 is normally urged downwardly by a spring 150 interposed between the valve member 128 and one end of an adjustable plunger 152, the other end of which is in engagement with the rounded end portion 140 of the manually adjustable screw member 138. The plug 136 is provided with a tubular extension 154 to slidably receive the plunger 152. A sealing ring 156 is carried by the end of the plunger which slides in the tubular extension to thereby seal the bore 132 from atmosphere. To make sure that the plunger 152 is always in driving engagement with the adjustable screw 138 a spring 158 is located between one end of the sleeve 130 and the plunger, to thereby urge the latter against the rounded end portion 140 of the screw. With the valve member 128 in its bottom position the top of the valve member is at the lower side of the radial passages 146, to allow maximum fluid flow through said passages. The range of flow of fluid through this valve is varied by changing the compressive force of the spring 150 acting on one end of the valve member. Increasing the compressive force of the spring 150 increases the flow range of the valve, and vice versa for a decrease in range. Once the adjustment is made manually for a required range of flow the valve will automatically maintain this flow since the valve member 128 moves up or down in accordance with the differential in pressure across the metering orifice 148, to thereby change the area of the radial passages 146.

The selector valve 127 comprises the housing 129 with a bore 160 into which a manually rotatable stem 162 extends. The lower end of the bore 160 is enlarged at 164 to receive a valve disc 166 slotted at 167 to engage a laterally extending flat end 168 of the stem 162. A seal 169 is carried by the stem 162 to prevent the escape of fluid under pressure to atmosphere from the bore 164. A split washer 170 encircles the stem 162 and is disposed in a recess 171 of the bore 160. A lug 172 is integral with the upper end of the stem 162 and lies adjacent said washer to retain the stem in the bore against axial displacement upwardly. This lug is also formed to engage a set screw 173 to thereby limit the rotation of said stem 162 to less than 360°. The stem and hence the valve disc 166 which is drivably connected thereto can be rotated between two extreme positions. A spring 174 is interposed between the lower end of the stem 162 and the top of the valve disc 166 to thereby tend to urge the stem upwardly and the valve disc downwardly onto a valve base 175. The enlarged bore 164 is furnished with an opening 176 to receive one end of the conduit 26 the other end of which is connected to a source of fluid under pressure such as the accumulator 12. The valve disc is formed with two passages 177 and 178 extending substantially axially therethrough (see Figures 3 and 4) passage 177 is restricted (i. e. bored to a very small diameter for a short distance) for a purpose to be explained hereafter. The valve base is oblong in shape with a machined surface 179 adapted to fit tightly against the ends of bores 132 and 164 so that the passage 134 of the valve bore registers with the bore 132. Seals 180 and 181 are located at the ends of bores 132 and 164 respectively in a manner to prevent leakage from between the valve base and housing to the atmosphere. The valve base is held against the housing 129 by screws 182, only one of which is shown. That portion of the valve base which registers with the enlarged bore 164, and against which the valve disc 166 rests, is machined and lapped to present a smooth surface to the valve disc which rotates on said base. That is, the bottom surface of the valve disc is formed parallel to the surface of that portion of the valve base in registry with the enlarged bore 164. The valve base is furnished with an opening 184 to threadedly engage one end of the pipe line 32 the other end of which is connected to the fluid motor mechanism. A passage 185 communicates the opening 184 with the surface of the valve base which is in registry with the bore 164. An opening 186 in the valve base connects one end of the pipe line 30 to the selector valve of the control device. This opening 186 is in communication with the bottom side of the valve disc through a passage 187. A passage 188 communicates the passage 134 with the bottom side of the valve disc. A plug 189 threadedly engages an expanded section 190 of the passage 134 to cut off this passage from the opening 184. The bottom side of the valve disc is formed with a kidney shaped recess 192 therein so that when the valve disc is in the position of Figure 3 openings 184 and 186 will be in communication via passages 185 and 187. And when the valve disc is in the position shown in Figure 4, opening 186 of the selector valve 127 is in communication with the opening 144 of the regulating valve 126, through passages 187, 188, 134, 148, and 146.

Figure 3:
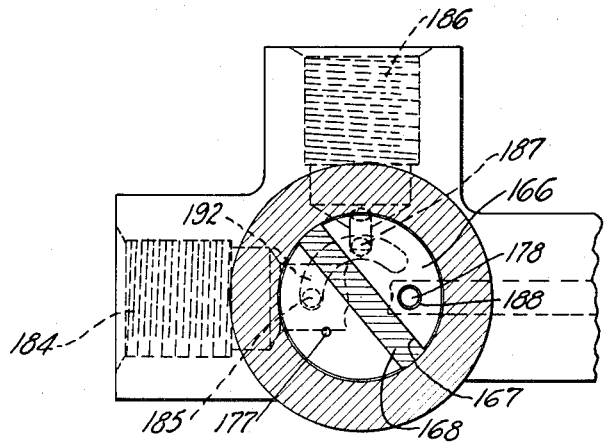
Figure 3 is a view in section taken on the line 3—3 of Figure 2 with the control device in "on" position.
Figure 4:
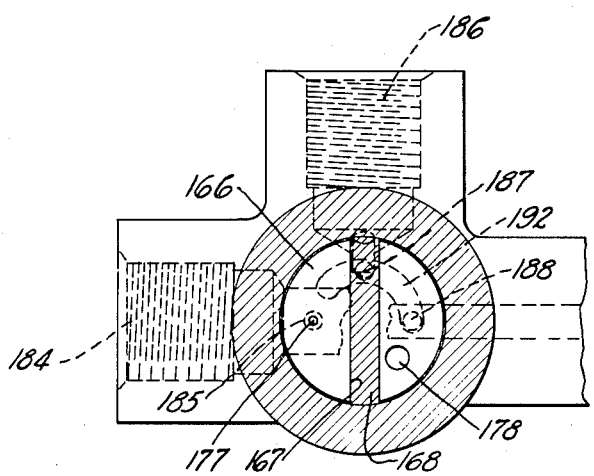
Figure 4 is a view in section taken on the line 3—3 of Figure 2 with the control device in "off" position.

With the valve disc in the position shown in Figure 3 fluid under pressure entering through opening 176 is free to flow through passage 178 in the valve disc, and passage 188 and 134 of the valve base, thence to bore 132 of the regulator valve. At this time the restricted passage 177 is cut off at the bottom of the valve disc by the valve base 175. However, with the disc rotated to the position of Figure 4, the restricted passage 177 will register with the passage 185 and passage 178 will be cut off from communication with the passage 188, the latter of which now communicates with the opening 186 via the recess 192.

Figure 2:
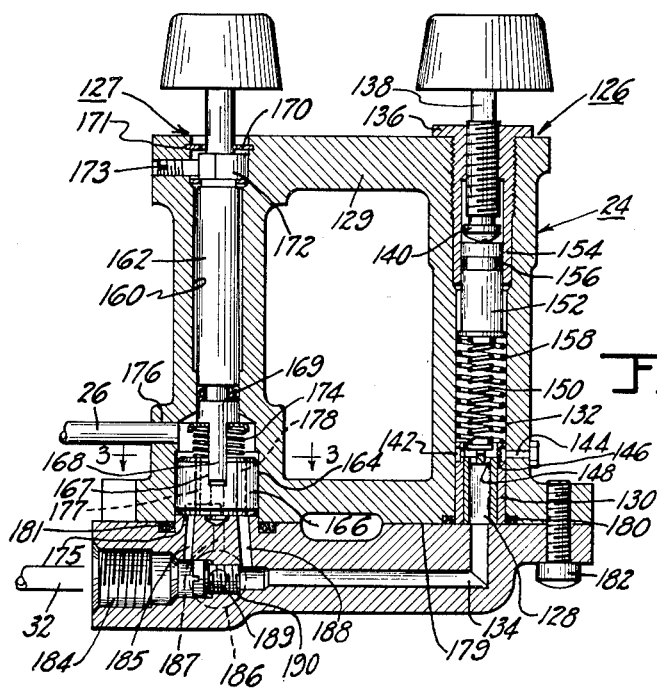
Figure 2 is a vertical sectional view of the control device used in the system for regulating the flow of fluid under pressure.

Operation of the apparatus of the system is as follows:

Assume a condition in the hydraulic system in which the accumulator is charged and the control device valves are in the positions shown in Figures 2 and 3. At this time fluid under pressure from the accumulator will flow into opening 176, through passages 178, 134, 148, and 146, pipe line 28, opening 90 of the fluid motor mechanism and passage 80 thereof, thence into the left end of bore 38. This moves the piston 42 to the right and in so doing displaces fluid from the right end of the bore 38. The fluid passing from this end of the bore flows through pipe line 32, opening 184 of the control device, and passages 185 and 187 thereof, thence through opening 186, pipe line 30, radial passages 78 of the sleeve 74, and into chamber 56, which is connected to reservoir. After the piston has reached the end of its stroke and shifted the valve spool to the left due to the action of the valve actuating mechanism, the fluid under pressure from the accumulator will now be fed to the right end of the bore 38. The flow of the fluid at this time will be from the right end of bore 36, through radial passages 78, opening 84, pipe line 30, passage 187, recess 192, passage 185, pipe line 32, and into the right end of bore 38, which moves the piston to the left end of the bore to thereby displace fluid from that end of the bore. This displaced fluid from the left end of the bore 38 flows out through passage 80, radial passages 76, the interior of sleeve 68, and thence to chamber 56, from where the fluid passes to the reservoir.

The oscillatory period of the shaft 50 may be varied by adjusting the position of the stem 138 which varies the force of spring 150 to thereby change the fluid flow through the regulator valve. Once set the valve will automatically maintain the flow within a predetermined range.

When it is desired to lock the shaft 50 against rotation the stem 162 of the selector valve is rotated so that the restricted passage 177 of the valve disc is in registry with passage 185 of the valve base. The recess 192 now connects passage 188 to passage 187. See Figure 4. With this setting of the selector valve the right end of the bore 38 of the fluid motor is connected to the accumulator through the restriction 177. The escape of fluid from the left end of the bore 38 is through passages 80 and 76, the interior of the sleeve 68, and thence to chamber 56. It will be noted that regardless of the position of the shaft 50 at the time the selector valve is turned to the position of Figure 4, the shaft will be rotated to the same predetermined place each time. The restriction of the passage 177 causes the fluid motor to move gradually to the locked or "parked" position so as not to injure its parts or any mechanism connected thereto (such as windshield wiper arms and blades).

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. In a fluid pressure system the combination of a fluid motor mechanism including a housing with a piston therein dividing said housing into opposed chambers, valve means for controlling the flow of fluid to said opposed chambers, means for establishing communication between said valve means and one of said opposed chambers, said valve means having a first position in which fluid under pressure is admitted to one of the opposed chambers and exhausted from the other opposed chamber and a second position in which fluid under pressure is admitted to said other opposed chamber and exhausted from said one of the opposed chambers, said valve means being operatively connected to said piston to be moved to said one position upon completion of a piston stroke in one direction and moved to said second position upon completion of a piston stroke in the opposite direction, and a control device remotely located from the fluid motor mechanism and adapted to be connected to a fluid pressure source, fluid connections from said control device to said valve means, a fluid connection from said control device to the other of the opposed chambers, said control device including a valve for automatically maintaining the flow of fluid under pressure to said opposed chambers substantially constant with variations in load on said piston.

2. In a hydraulic system the combination of a source of fluid under pressure, a fluid motor mechanism including a housing with a piston therein dividing said housing into opposed chambers, valve means for controlling the flow of fluid to said opposed chambers, a passage connecting said valve means to one of the opposed chambers, said valve means having a first position in which fluid under pressure is admitted to one of the opposed chambers and exhausted from the other opposed chamber and a second position in which fluid under pressure is admitted to said other opposed chamber and exhausted from said one of the opposed chambers, said valve means being operatively connected to said piston to be moved to said one position upon completion of a piston stroke in one direction and moved to said second position upon completion of a piston stroke in the opposite direction, and a control device remotely located from the fluid motor mechanism and having a fluid connection to said source, fluid connections from said control device to said valve means, a fluid connection from said control device to the other of the opposed chambers, said control device including a valve mechanism manually adjustable for preselecting the rate of flow of fluid to the chambers, said valve mechanism being constructed and arranged to automatically maintain the flow of fluid to said chambers at a substantially uniform rate notwithstanding variations in the pressure of said source.

3. In a fluid pressure system for controlling a fluid motor having a movable piston member and opposed pressure chambers on opposite sides of said member together with coacting valve means for controlling the flow of fluid to said opposed chambers having a first position in which fluid under pressure is admitted to one of the opposed chambers and exhausted from the other opposed chamber and a second position in which fluid under pressure is admitted to said other opposed chamber and exhausted from said one of the opposed chambers, said valve means being operatively connected to said piston member to be moved to said one position upon completion of a piston stroke in one direction and moved to said second position upon completion of a piston stroke in the opposite direction, a control device for said motor having a connection to a fluid pressure source, fluid connections from said control device to said opposed chambers via said valve means, said control device including means selectively operable to communicate one of said opposed chambers to said pressure source through a restricted flow orifice and the other of said opposed chambers to exhaust for hydraulically locking the piston member in a preselected position, said restricted orifice functioning to retard movement of said piston to its locked position.

4. In a fluid pressure system for controlling a fluid motor having a movable piston member and opposed pressure chambers on opposite sides of said member together with coacting valve means for controlling the flow of fluid to said opposed chambers having a first position in which fluid under pressure is admitted to one of the opposed chambers and exhausted from the other opposed chamber and a second position in which fluid under pressure is admitted to said other opposed chamber and exhausted from said one of the opposed chambers, said valve means being operatively connected to said piston member to be moved to said one position upon completion of a piston stroke in one direction and moved to said second position upon completion of a piston stroke in the opposite direction, a control device for said motor having fluid connections to said fluid pressure source and to said valve means, said control device being provided with means for hydraulically locking said piston member in a given position in said housing including a selector valve movable to insert a restricted flow orifice in one of said fluid connections, said restricted flow orifice functioning to retard movement of said piston to its locked position.

5. In a fluid pressure system for controlling a fluid motor having a movable piston member and opposed pressure chambers on opposite sides of said member together with coacting valve means for controlling the flow of fluid to said opposed chambers having a first position in which fluid under pressure is admitted to one of the opposed chambers and exhausted from the other opposed chamber and a second position in which fluid under pressure is admitted to said other opposed chamber and exhausted from said one of the opposed chambers, said valve means being operatively connected to said piston member to be moved to said one position upon completion of a piston stroke in one direction and moved to said second position upon completion of a piston stroke in the opposite direction, a control device for said motor including a regulator valve and selector valve, said selector valve having connections to said source and also to said valve means and to the other of the opposed chambers, one of the connections to said valve means being through the regulator valve, said selector valve having a motor-energizing position in which the opposed chambers are connected to the pressure source via said valve means and a piston-locking or parking position in which only one of the said opposed chambers is connected directly to said source, and a flow restriction in said latter connection to retard movement of the piston when the latter moves to a locked or parked position.

6. In a fluid pressure system the combination of a fluid motor mechanism including a housing with a piston therein dividing said housing into opposed chambers, valve means for controlling the flow of fluid to said opposed chambers, means for establishing communication between said valve means and one of said opposed chambers, said valve means having a first position in which fluid under pressure is admitted to one of the opposed chambers and exhausted from the other opposed chamber and a second position in which fluid under pressure is admitted to said other opposed chamber and exhausted from said one of the opposed chambers, said valve means being operatively connected to said piston to be moved to said one position upon completion of a piston stroke in one direction and moved to said second position upon completion of a piston stroke in the opposite direction, and a control device remotely located from the fluid motor mechanism and adapted to be connected to a fluid pressure source, means for communicating fluid under pressure from said source to said valve means through a passageway provided in said control device, said control device including valve means arranged to automatically maintain the flow of fluid through said passageway substantially constant irrespective of variations in load on said piston.

References Cited in the file of this patent

UNITED STATES PATENTS

| | | |
|---|---|---|
| 1,674,056 | Oishei et al. | June 19, 1928 |
| 1,730,827 | Schilling | Oct. 8, 1929 |
| 2,042,186 | Peterson | May 26, 1936 |
| 2,257,066 | O'Shei | Sept. 23, 1941 |
| 2,263,003 | Koppelman | Nov. 18, 1941 |
| 2,267,177 | Twyman | Dec. 23, 1941 |
| 2,344,913 | Ager | Mar. 21, 1944 |
| 2,432,305 | Geiger | Dec. 9, 1947 |
| 2,463,005 | Ulrich, Jr. | Mar. 1, 1949 |
| 2,516,558 | Freedman et al. | July 25, 1950 |
| 2,547,175 | Sacchini | Apr. 3, 1951 |
| 2,583,348 | Utter | Jan. 22, 1952 |